J. BOWEN.

BED BOTTOM.

No. 9,941. Reissued Nov. 22, 1881.

WITNESSES

Fred. L. Dieterich.

P. C. Dieterich.

INVENTOR

Jesse Bowen by DeWitt C. Allen Attorney

N. PETERS, Photo-Lithographer, Washington, D. C.

UNITED STATES PATENT OFFICE.

JESSE BOWEN, OF LANCASTER, OHIO.

BED-BOTTOM.

SPECIFICATION forming part of Reissued Letters Patent No. 9,941, dated November 22, 1881.

Original No. 226,026, dated March 30, 1880. Application for reissue filed October 25, 1881.

*To all whom it may concern:*

Be it known that I, JESSE BOWEN, of Lancaster, in the county of Fairfield and State of Ohio, have invented certain new and useful Improvements in Spring Bed-Bottoms; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to certain new and useful improvements in the class of flexible slats more especially designed for bed-bottoms, and in which the slats are strengthened and their flexibility increased by applying to the under side thereof elastic extension-rods, forming single elastic supporting devices for the slats, which are elongated as the flexible slats are deflected from any shape or form they may assume from their normal positions, or when not weighted or in use.

The object of my invention is the production of a spring wherein the elasticity of the extension-rod may be equalized with reference to the flexible slat to which it is connected, and thereby equalize the pressure brought to bear on the slat throughout its entire length; and to this end the invention consists in novel features of construction and combination and arrangement of parts, all as will be hereinafter fully described, and particularly designated in the claims.

Figure 1:
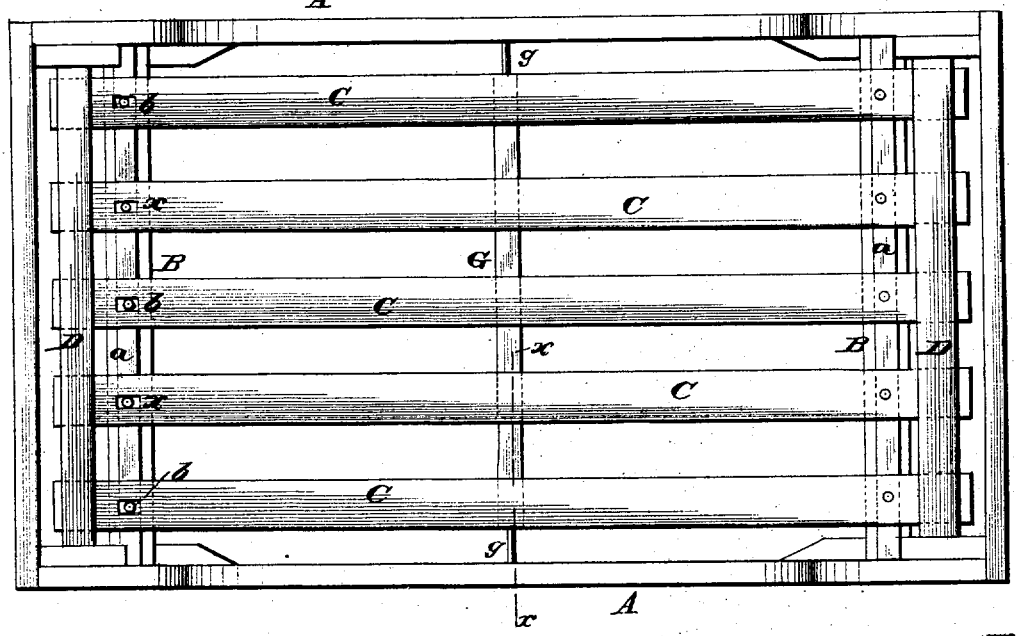
Figure 2:
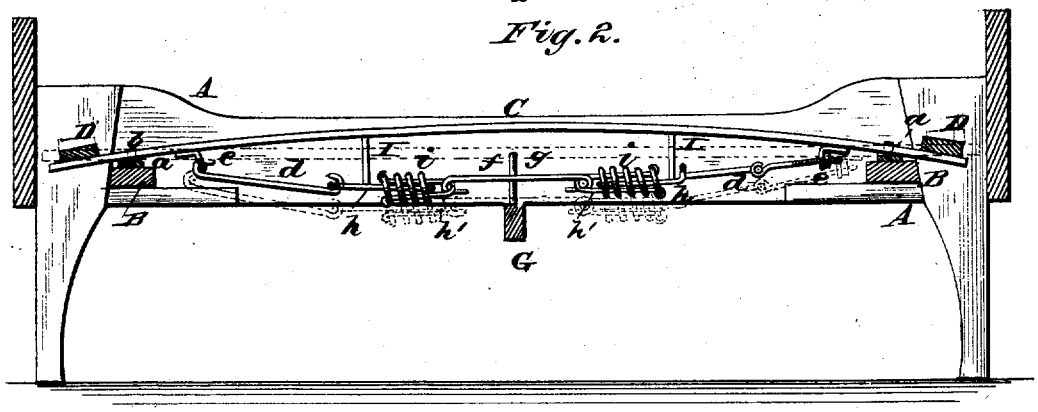
Figure 3:
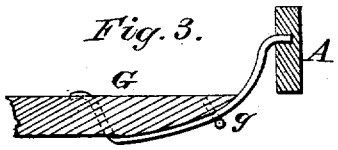
Figure 4:
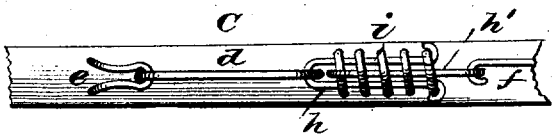

Referring to the accompanying drawings, Figure 1 represents a top view or plan of my improved spring bed-bottom; Fig. 2, a longitudinal vertical section of the same; Fig. 3, an enlarged transverse section through the line *x x*, Fig. 1, with the flexible slats removed; Fig. 4, an enlarged detached view of a portion of one of the spring or flexible slats.

In the drawings, A represents a bedstead, provided near each end with a cross-bar, B, which has a narrow rib, *a*, on top, extending the entire length. Upon these cross-bars B the flexible bed-slats C are laid, and held from any lateral movement by means of upwardly-projecting pins *b*, passing through elongated slots *x* in the slats, which permit of the necessary longitudinal movement of said slats when pressure is brought to bear downward upon them. The ends of the slats C are also passed under other cross-bars, D, at the ends of the bedstead. Each slat C has on its under side two bridges, I I, arranged upon opposite sides of its central point, all as clearly shown in Fig. 2. Near each end of the slat is, by a staple, *e*, or its equivalent, connected a rod, *d*, which extends inward to the lower end of the corresponding bridge I. At this point the rod *d* connects with a double hook, *h*, around which is placed a compressed spiral spring, *i*. Another double hook, *h'*, is also passed in an opposite direction through the spring *i*, and the two double hooks *h h'* are connected by a double-hooked rod, *f*, thus forming a connection between the compressed springs, which, it will be observed, are arranged intermediate of the bridges, and also a double-spring connection between the extremities of the slats intermediate of the bridges.

The above described arrangement of parts forms an elastic supporting device for the slat, and which, in the stretching or extension of the same by the deflection of the slat, will be met by increased resistance due to the arrangement of the compressed springs and their connection together and to the slats, and also to the fact that said springs, being arranged intermediate of the bridges, will retain their horizontal position relative to each other, and thus offer still greater resistance as the slats are deflected, and thereby more fully equalize the downward pressure on the slats throughout their entire lengths. It will therefore be readily seen that the heavier the pressure is the more resistance the springs will give, and the tension of which can be increased or diminished by take-up nuts or similar devices usually employed for this purpose.

G represents a central transverse bar, suspended from the side bars of the bedstead by hooked and bent rods *g g*, more clearly shown in Fig. 3. The object of the bar G is to prevent the flexible slats from being forced too far downward when great pressure is brought to bear upon any one of them, as the elastic supporting device will strike against or rest upon said bar, as shown in dotted lines, Fig. 2, and still further offer increased resistance to the downward pressure or deflection of the flexible slat.

I am aware that a spring or flexible slat having a similar arrangement of bridges, and a rod connecting the extremities of the slats, and formed with a spiral spring intermediate of the bridges, is old. Such construction is, however, obviously objectionable, as the spring will readily yield or pull apart, where the slat is deflected, without offering much resistance, and which will soon lose its elasticity.

I am also aware that a flexible slat having a central bridge and a rod connecting its extreme ends, having compressed springs arranged on opposite sides of said central bridge, is old; but in such construction it will be readily seen that the increased resistance due to said springs will be brought upon the bridge and the slat at that point, and thus form a very hard or unyielding surface at the central portion of the bed-bottom, and which is found to be impracticable.

My improved supporting device obviates the above defects, as the compressed springs, as arranged in connection with the two bridges, will equalize the downward pressure or deflection of the slat, while the springs will offer increased resistance by their being on the same horizontal plane.

Having thus fully described my invention, what I claim as new, and desire to secure by Letters Patent, is—

1. A spring consisting of a flexible slat, having bridges I I, arranged upon its under side and upon opposite sides of its center, and compressed springs *i i*, arranged intermediate of said bridges, and connected together and to the slat near its ends, substantially as and for the purpose herein shown and described.

2. In a spring bed-bottom, the combination of a series of flexible slats each having bridges I I, arranged upon its under side and upon opposite sides of its center, and compressed springs *i i*, arranged intermediate of said bridges and connected together by rods *f*, and to the slats, near their ends, by rods *d d*, and the transverse central suspended supporting-bar, G, substantially as and for the purpose herein shown and described.

3. In a spring bed-bottom, a series of flexible slats having their ends placed over cross-bars B and held down by cross-bars D, and each flexible slat provided with bridges I I, intermediate compressed springs, *i i*, double hooks *h h'*, central connecting-rod, *f*, and end connecting-rods, *d d*, substantially as and for the purpose herein shown and described.

4. In a spring bed-bottom, a series of flexible slats having their ends placed over cross-bars B and held down by cross-bars D, and each flexible slat provided with bridges I I, intermediate compressed springs, *i i*, double hooks *h h'*, central connecting-rod, *f*, and end connecting-rods *d d*, in combination with the transverse central suspended supporting-bar, G, substantially as and for the purpose herein shown and described.

5. In a spring bed-bottom, a series of flexible slats having their ends placed over cross-bars B and held down by cross-bars D, and each slat provided with bridges I I, intermediate compressed springs, *i i*, double hooks *h h'*, central connecting-rod, *f*, end connecting-rods, *d d*, and devices for regulating the tension of the springs, substantially as and for the purpose herein shown and described.

6. In a spring bed-bottom, a series of flexible slats, and each slat provided with bridges I I, intermediate compressed springs, *i i*, double hooks *h h'*, central connecting-rod, *f*, and end connecting-rods, *d d*, in combination with the transverse central suspended supporting-bar, G, substantially as and for the purpose herein shown and described.

In testimony whereof I affix my signature in presence of two witnesses.

JESSE BOWEN.

Witnesses:
WALTER S. BOWEN,
D. C. ALLEN.